(12) United States Patent
Lai

(10) Patent No.: US 10,215,209 B2
(45) Date of Patent: Feb. 26, 2019

(54) ALUMINUM CABINET

(71) Applicant: REFINE SCIENTIFIC CO., LTD., Changhua County (TW)

(72) Inventor: Sung-Li Lai, Changhua County (TW)

(73) Assignee: Refine Scientific Co., Ltd., Changhua County (TW)

( * ) Notice: Subject to any disclaimer, the term of this patent is extended or adjusted under 35 U.S.C. 154(b) by 86 days.

(21) Appl. No.: 15/405,672

(22) Filed: Jan. 13, 2017

(65) Prior Publication Data

US 2018/0094664 A1    Apr. 5, 2018

(30) Foreign Application Priority Data

Sep. 30, 2016    (TW) .............................. 105214947 U

(51) Int. Cl.
| | |
|---|---|
| *A47B 43/00* | (2006.01) |
| *F16B 12/30* | (2006.01) |
| *A47B 47/00* | (2006.01) |
| *A47B 47/02* | (2006.01) |
| *F16B 12/20* | (2006.01) |
| *F16B 12/32* | (2006.01) |

(52) U.S. Cl.
CPC .......... *F16B 12/30* (2013.01); *A47B 47/0075* (2013.01); *A47B 47/025* (2013.01); *F16B 12/2036* (2013.01); *F16B 12/32* (2013.01)

(58) Field of Classification Search
CPC ...... F16B 12/30; F16B 12/2009; F16B 12/10; F16B 12/2036; F16B 5/01; A47B 47/0075; A47B 47/025; A47B 47/0066; A47B 47/042; A47B 47/0041; A47B 47/02; A47B 47/024; A47B 47/0091; A47B 47/047; A47B 95/00; A47B 9/066; Y10T 403/46; Y10T 403/4602; Y10T 403/4608
USPC ...................................... 312/351, 257.1, 263
See application file for complete search history.

(56) References Cited

U.S. PATENT DOCUMENTS

| | | | | |
|---|---|---|---|---|
| 3,435,575 A | * | 4/1969 | Pottiez ............... | A47B 47/0041 312/108 |
| 4,131,376 A | * | 12/1978 | Busse ................ | F16B 12/2036 312/263 |

(Continued)

FOREIGN PATENT DOCUMENTS

| | | | | |
|---|---|---|---|---|
| EP | 2428137 | * | 3/2012 | |
| WO | WO 2010/060987 | * | 6/2010 | |

*Primary Examiner* — Daniel J Troy
*Assistant Examiner* — Timothy M Ayres
(74) *Attorney, Agent, or Firm* — Rosenberg, Klein & Lee

(57) ABSTRACT

An aluminum cabinet is revealed. A plurality of positioning members is disposed on an upper edge, a lower edge and a middle part of an inner surface of two side plates. Two outer main plates are set between the two side plates respectively. An assembly block arranged at each of two sides of the outer main plate is mounted with an assembly member. The assembly member is mounted with and connected to the positioning member. An inner partition is arranged between the two side plates. A fixing block disposed on each of two sides of the inner partition is mounted with a fixing member. A fixing pin mounted in the fixing member is mounted with and connected to the positioning member. Thereby the connecting components are hidden after assembling. Thus not only the visual appearance of the cabinet is more pleasing, the sense of value is also increased.

6 Claims, 8 Drawing Sheets

(56) References Cited

U.S. PATENT DOCUMENTS

| | | | | |
|---|---|---|---|---|
| 5,451,102 A * | 9/1995 | Chuan | ................... | F16B 12/14 |
| | | | | 312/257.1 |
| 5,813,738 A * | 9/1998 | Cheng | ................... | F16B 12/14 |
| | | | | 312/257.1 |
| 6,113,205 A * | 9/2000 | Kuo | ................... | F16B 12/125 |
| | | | | 108/143 |
| 6,908,252 B1 * | 6/2005 | Rubano | ............... | F16B 12/2027 |
| | | | | 403/231 |
| 7,223,045 B2 * | 5/2007 | Migli | ................ | F16B 12/2009 |
| | | | | 29/452 |
| 8,162,559 B2 * | 4/2012 | Krige | ................ | A47B 47/0025 |
| | | | | 108/193 |
| 2010/0008744 A1 * | 1/2010 | Tseng | ................ | A47B 47/0075 |
| | | | | 411/166 |
| 2010/0202852 A1 * | 8/2010 | Krause | ............... | F16B 12/2027 |
| | | | | 411/272 |

\* cited by examiner

ALUMINUM CABINET

BACKGROUND OF THE INVENTION

Field of the Invention

The present invention relates to an aluminum cabinet, especially to an aluminum cabinet in which connecting components used are hidden after assembling. Thus not only the appearance of the cabinet is more appealing, the sense of value is dramatically improved owing to minimum exposure of the connecting components.

Description of Related Art

Cabinets are widely used in our daily lives. Most of the cabinets are produced in factory and then delivered to common customers. The cabinet with a certain volume is difficult to be transported and stored. Thus there is a plurality of flat-packed cabinet products with compact designs available now for users to assembly the cabinets by themselves at home. The compact design and flat package of the cabinet products make them easy to transport after purchase. Then the cabinet products are set up at the place required and threaded fasteners (such as screws, bolts, nuts, etc) are used to build the cabinet.

While in use, plates of the cabinet are threaded and connected to one another by the threaded fasteners with the expected functions. However, many threaded fasteners are exposed outside the surface of the cabinet after being assembled. The appearance of the cabinet is not aesthetically pleasing and the sense of quality is not good.

Thus there is room for improvement and there is a need to provide a novel aluminum cabinet that overcomes the shortcomings mentioned above.

SUMMARY OF THE INVENTION

Therefore it is a primary object of the present invention to provide an aluminum cabinet in which connecting components used for assembly of the cabinet are hidden. Thus the pleasing appearance of the cabinet is maintained and the sense of quality is reinforced significantly owing to minimum exposure of the connecting components.

In order to achieve the above object, an aluminum cabinet according to the present invention mainly includes at least two side plates, at least two outer main plates, and at least one inner partition, all made from aluminum alloy.

An upper edge, a lower edge and a middle part of an inner surface of the side plate are disposed with a plurality of positioning members. The positioning member includes a screw portion used for threading and fixing the positioning member on the side plate. A mounting segment is extended from the screw portion and a stopping portion is connected to an outer end of the mounting segment.

The outer main plates are set between an upper end and a lower end of the two side plates respectively. The outer main plate includes a receiving portion arranged at each of two sides thereof for receiving an assembly block. At least one assembly holes are formed on the assembly block and a penetrating hole corresponding to the assembly hole is set on the outer main plate. One end of the assembly block corresponding to the side plate is set with a detent holes communicating with the assembly hole. An assembly member is mounted into the assembly hole of the assembly block. A detent slot corresponding to the detent hole and used for connection to the mounting segment of the positioning member is mounted on one end of the assembly member. A mounting slot is located at a lateral side of the detent slot, communicating with the detent slot and connected to the stopping portion of the positioning member. A mounting groove is formed on an outer surface of the assembly member.

The inner partition is arranged between the two side plates. A connection portion is formed on each of two sides of the inner partition for mounting a fixing block. A fixing hole is set on a bottom surface of the fixing block and one end of the fixing block corresponding to the side plate is arranged with a fixing slot communicating with the fixing hole. An open hole corresponding to the fixing hole and the fixing slot is mounted on a bottom surface of the inner partition. A fixing member is mounted in the fixing hole of the fixing block and is arranged with a fixing groove corresponding to the fixing slot. A fixing pin is mounted in the fixing member. An insertion slot corresponding to the fixing groove and used for connection to the mounting segment of the positioning member is formed on the fixing pin. A receiving slot located at a lateral side of the insertion slot and communicating with the insertion slot is used for connection to the stopping portion of the positioning member. A receiving groove is on an outer surface of the fixing pin and corresponding to the fixing hole.

The mounting groove on the outer surface of the assembly member can be driven by a Phillips screwdriver, or a slotted screwdriver.

Each of two sides of the outer main plate is covered by a protective board that is set with an insertion hole corresponding to the detent hole of the assembly block.

The receiving groove on the outer surface of the fixing pin can be driven by a Phillips screwdriver, or a slotted screwdriver Each of two sides of the inner partition is covered by a protective plate that is set with an opening corresponding to the fixing slot of the fixing block.

A back plate is used to connect to and fix on a rear surface of a cabinet formed by the side plates, the outer main plates, and the inner partition.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn functions and features of the present invention, please refer to the following embodiments and related figures.

Figure 1:
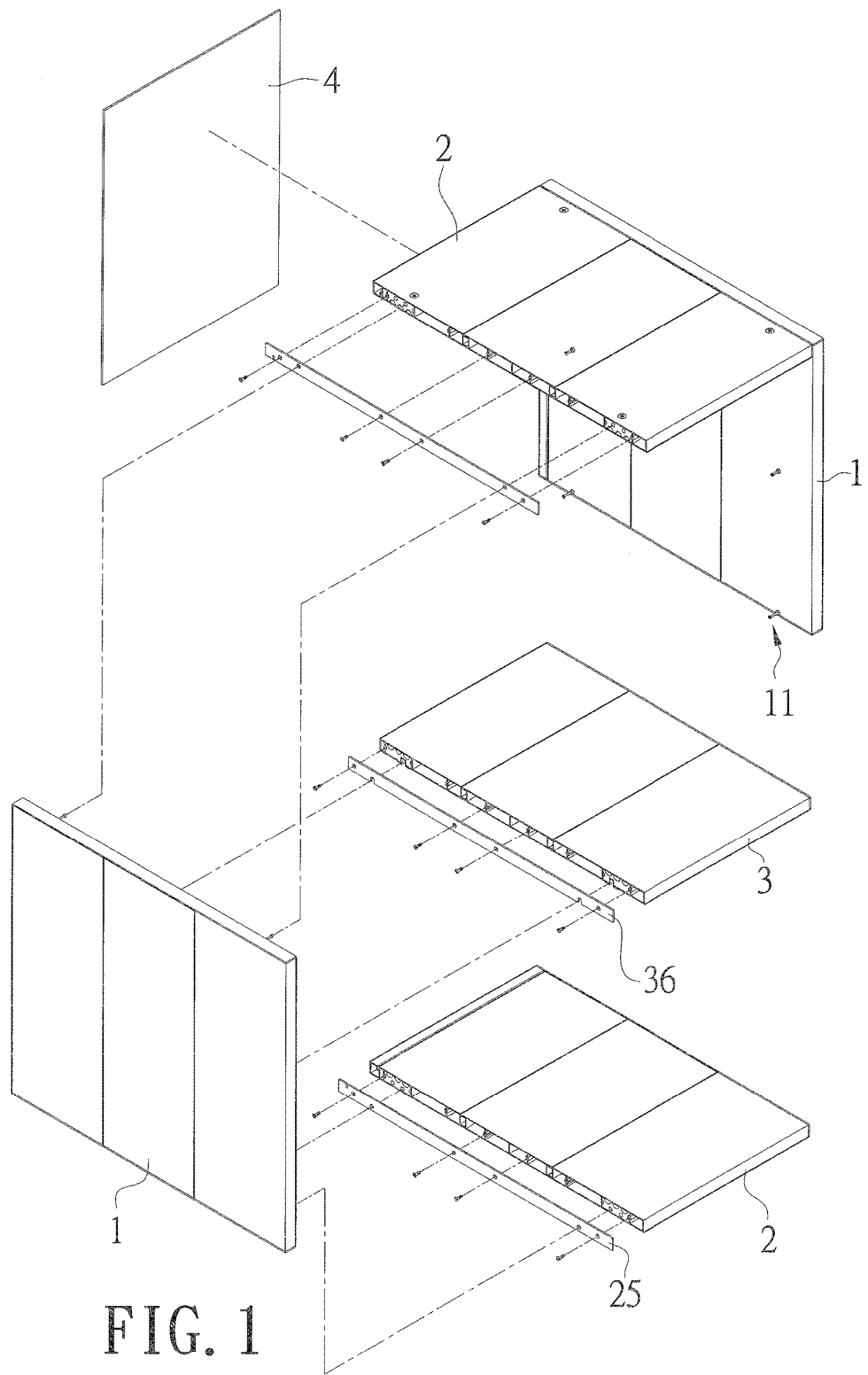
FIG. 1 is an explosive view of an embodiment according to the present invention.
Figure 2:
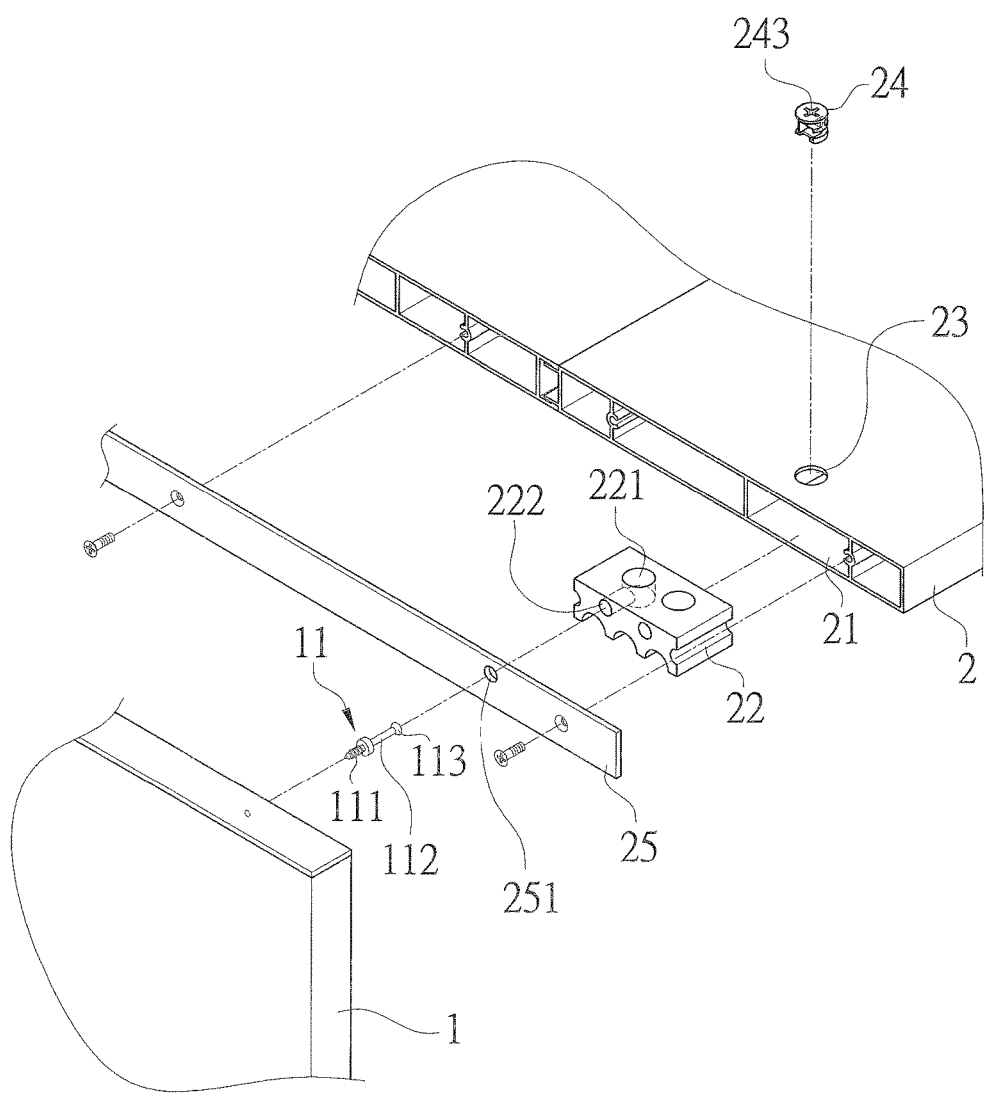
FIG. 2 is a partial enlarged explosive view of an outer main plate of an embodiment according to the present invention.
Figure 3:
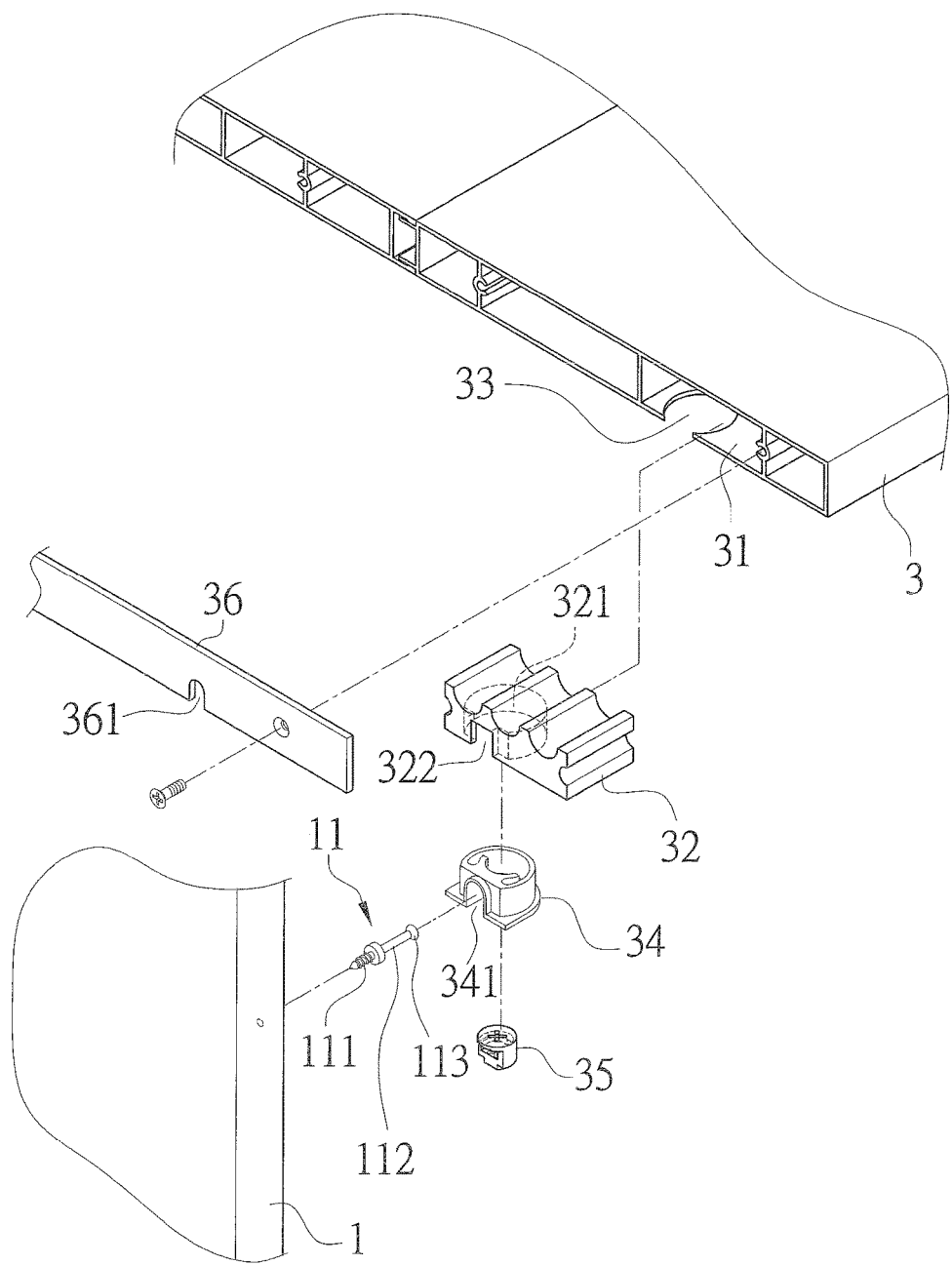
FIG. 3 is a partial enlarged explosive view of an inner partition of an embodiment according to the present invention.

Refer to FIG. 1, FIG. 2, and FIG. 3, an aluminum cabinet according to the present invention mainly includes two side plates 1, two outer main plates 2, an inner partition 3 and a back plate 4, all made from aluminum alloy.

A plurality of positioning members 11 is disposed on an upper edge, a lower edge and a middle part of an inner surface of the side plate 1. A screw portion 111 is formed on the positioning member 11 and used for threading and fixing the positioning member 11 on the side plate 1. A mounting segment 112 is extended from the screw portion 111 and a stopping portion 113 is connected to and disposed on an outer end of the mounting segment 112.

Figure 4:
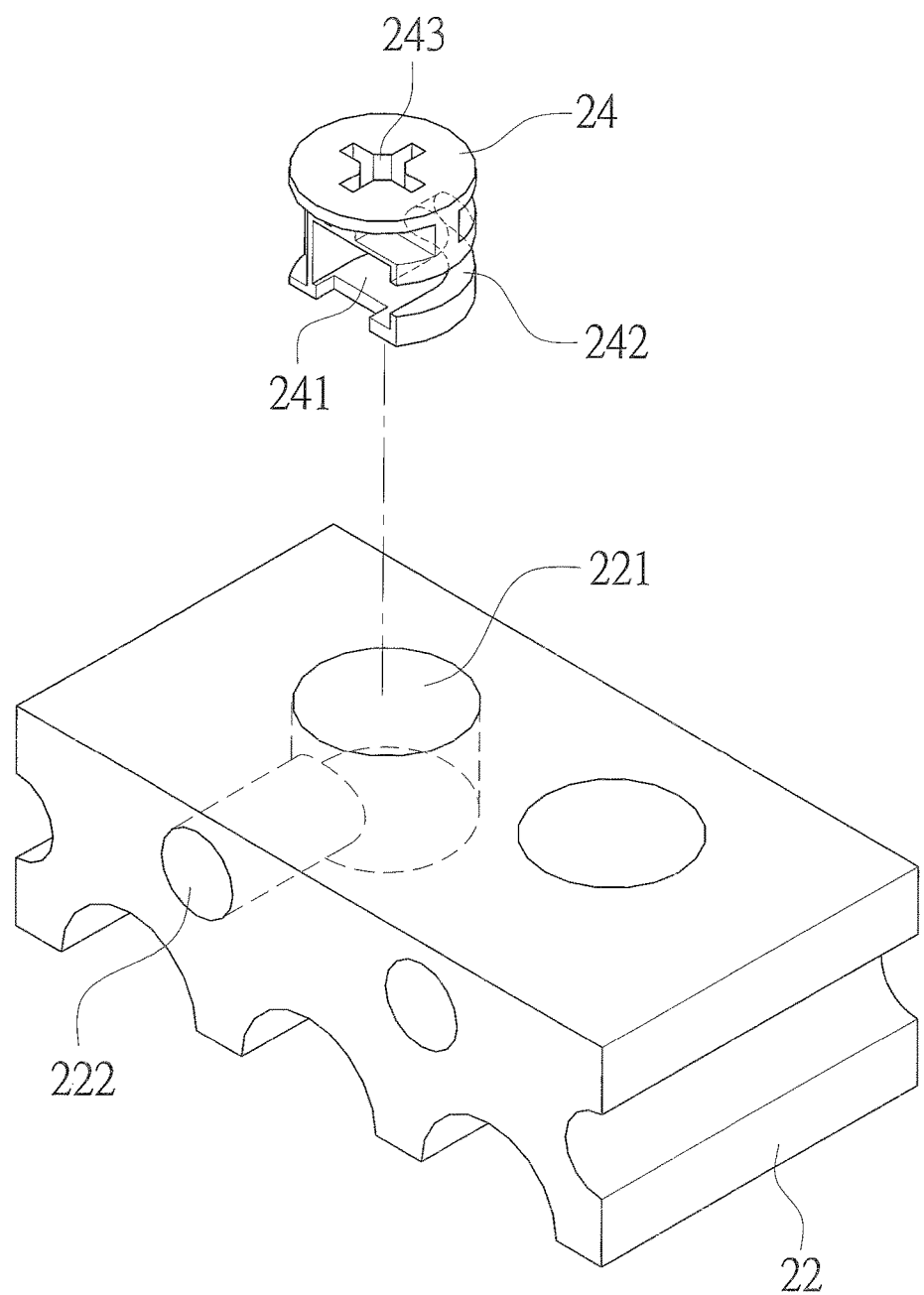
FIG. 4 is a perspective view of an assembly block and an assembly member of an embodiment according to the present invention.

Refer to FIG. 2 and FIG. 4, the outer main plates 2 are set between an upper end and a lower end of the two side plates 1 respectively. The outer main plate 2 includes a receiving portion 21 disposed on each of two sides thereof for receiving an assembly block 22. Two assembly holes 221 are formed on the assembly block 22 while a penetrating hole 23 corresponding to the assembly hole 221 is arranged at the outer main plate 2. One end of the assembly block 22 corresponding to the side plate 1 is set with detent holes 222 each of which is communicating with the assembly hole 221. An assembly member 24 is mounted into the assembly hole 221 of the assembly block 22. The assembly member 24 includes a detent slot 241 corresponding to the detent hole 222, a mounting slot 242 located at a lateral side of the detent slot 241 and communicating with the detent slot 241, and a mounting groove 243 on an outer surface thereof and corresponding to the assembly hole 221. The mounting groove 243 can be driven by a Phillips screwdriver, a slotted screwdriver or other tool. Each of two sides of the outer main plate 2 is covered by a protective board 25 that is set with an insertion hole 251 corresponding to the detent hole 222 of the assembly block 22.

Figure 5:
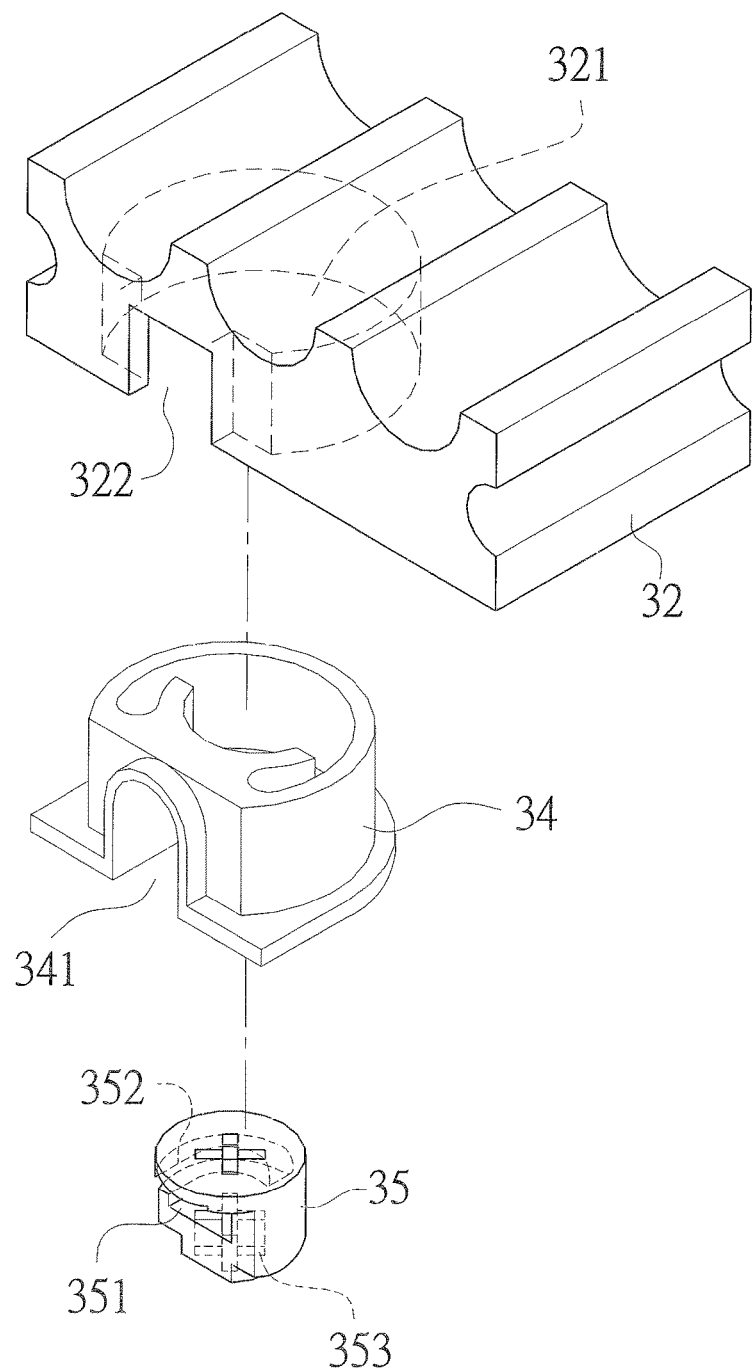
FIG. 5 is a perspective view of a fixing block, a fixing member and a fixing pin of an embodiment according to the present invention.

Refer to FIG. 3 and FIG. 5, the inner partition 3 is arranged between the two side plates 1. A connection portion 31 is set on each of two sides of the inner partition 3 for mounting a fixing block 32. A fixing hole 321 is formed on a bottom surface of the fixing block 32 and one end of the fixing block 32 corresponding to the side plate 1 is arranged with a fixing slot 322 communicating with the fixing hole 321. An open hole 33 corresponding to both the fixing hole 321 and the fixing slot 322 is mounted on a bottom surface of the inner partition 3. A fixing member 34 is mounted in the fixing hole 321 of the fixing block 32 and is arranged with a fixing groove 341 corresponding to the fixing slot 322. A fixing pin 35 is mounted in the fixing member 34 and including an insertion slot 351, a receiving slot 352 and a receiving groove 353. The insertion slot 351 is corresponding to the fixing groove 341. The receiving slot 352 is located at a lateral side of the insertion slot 351 and communicating with the insertion slot 351. The receiving groove 353 is on an outer surface of the fixing pin 35 and corresponding to the fixing hole 321. The receiving groove 353 can be driven by a Phillips screwdriver, a slotted screwdriver or other tool. Each of two sides of the inner partition 3 is covered by a protective plate 36 that is set with an opening 361 corresponding to the fixing slot 322 of the fixing block 32.

The back plate 4 is used to connect to and fix on a rear surface of a cabinet formed by the side plates 1, the outer main plates 2, and the inner partition 3.

Figure 6:
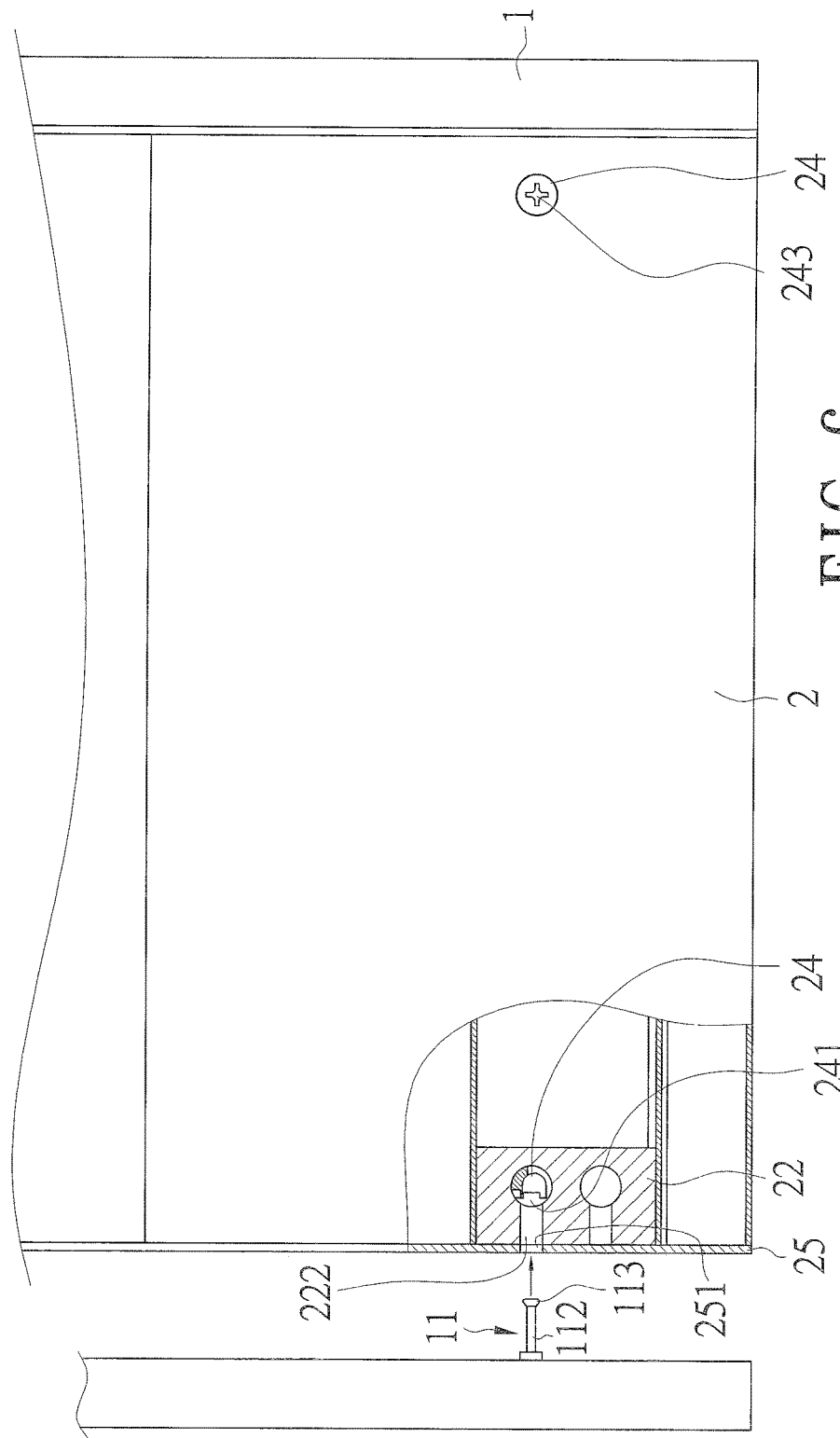
FIG. 6 is a partial sectional view showing assembling of an embodiment according to the present invention.
Figure 7:
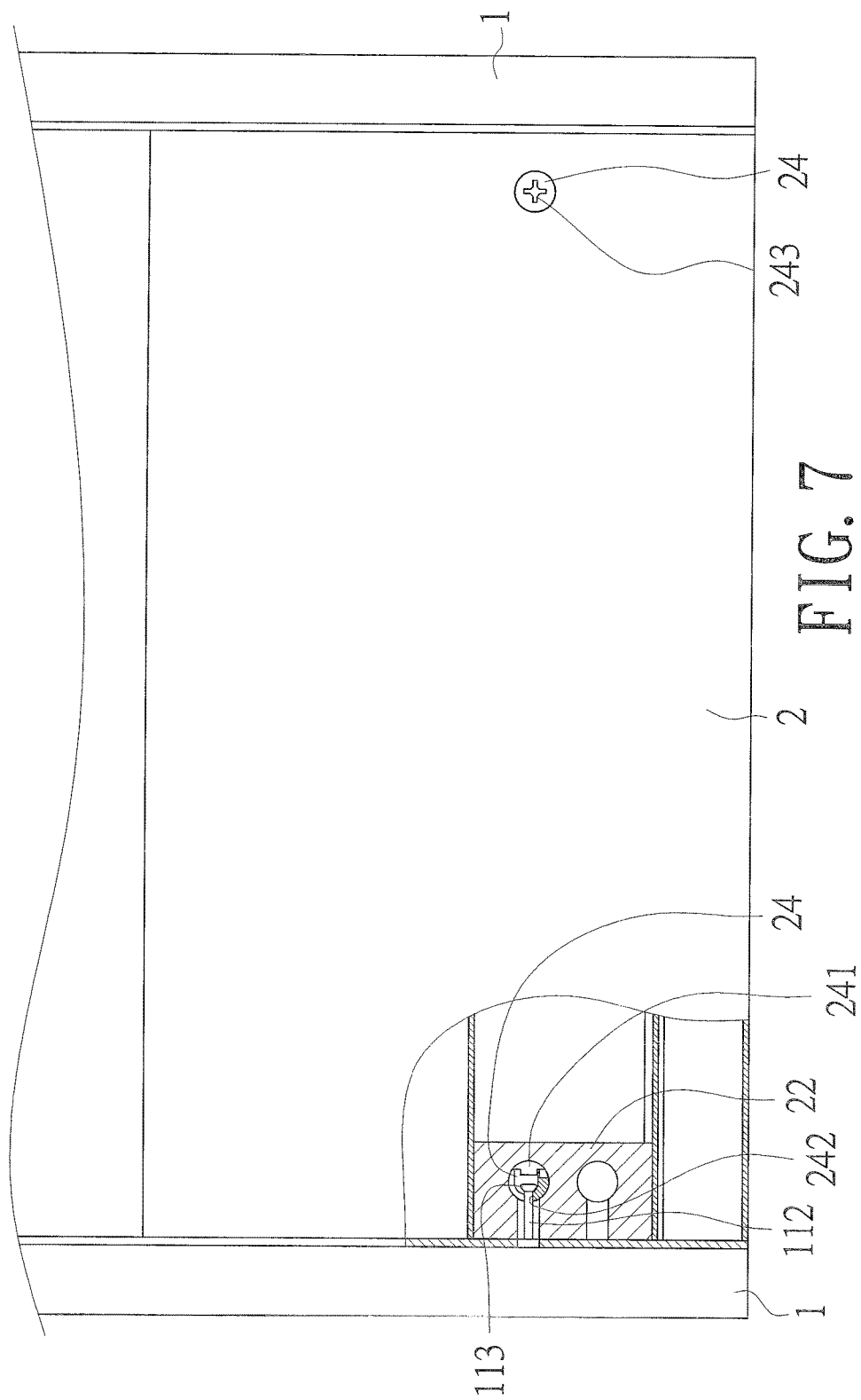
FIG. 7 is another partial sectional view showing assembling of an embodiment according to the present invention.

While being assembled, first a plurality of positioning members 11 is disposed on an upper edge, a lower edge and a middle part of an inner surface of the side plate 1. The positioning members 11 are fixed and threaded on the side plate 1 by the screw portions 111. The outer main plates 2 are aligned with an upper and a lower end of the two side plates 1 and then the mounting segment 112 of the positioning member 11 is passed through the insertion hole 251 of the protective board 25 and the detent holes 222 of the assembly block 22 to be mounted into the detent slot 241 of the assembly member 24. Also refer to FIG. 6, now pass the Phillips screwdriver, a slotted screwdriver, or other tool through the penetrating hole 23 of the outer main plate 2 and mount into the mounting groove 243 of the assembly member 24 for rotating the assembly member 24 so as to move the mounting slot 242 communicating with the detent slot 241 to be connected to and positioned by the stopping portion 113 of the positioning member 11, as shown in FIG. 7. Thus the assembly of the side plates 1 with the outer main plates 2 has been completed.

Figure 8:
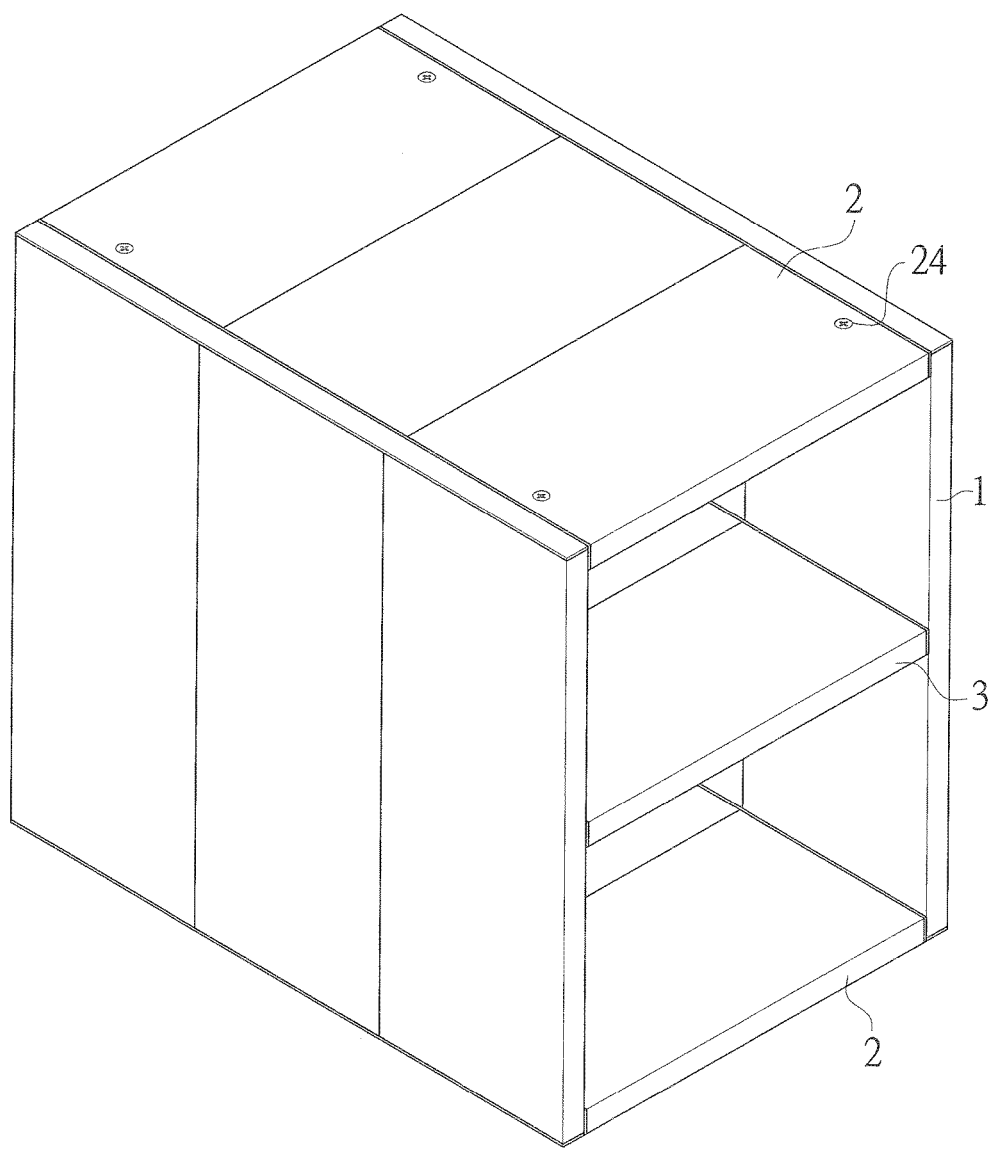
FIG. 8 is a perspective view of an embodiment according to the present invention.

Next the inner partition 3 is set between the two side plates 1. The mounting segment 112 of the positioning member 11 is passed through the opening 361 of the protective plate 36, the open hole 33 of the inner partition 3 and the fixing slot 322 of the fixing block 32 to be mounted between the fixing groove 341 of the fixing member 34 and the insertion slot 351 of the fixing pin 35. Also pass the Phillips screwdriver, a slotted screwdriver, or other tool through the open hole 33 of the inner partition 3 and mount into the receiving groove 353 of the fixing pin 35 for rotating the fixing pin 35. Thus the receiving slot 352 communicating with the insertion slot 351 is moved to be connected to and positioned by the stopping portion 113 of the positioning member 11 for completing the assembly of the inner partition 3 with the two side plates 1. Then the back plate 4 is connected to and fixed on a rear surface of a cabinet formed by the side plates 1, the outer main plates 2, and the inner partition 3 connected, as shown in FIG. 8.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. An aluminum cabinet comprising:
   at least two side plates made from aluminum alloy;
   at least two outer main plates made from aluminum alloy; and
   at least one inner partition made from aluminum alloy;
   wherein an upper edge, a lower edge and a middle part of an inner surface of the side plate are disposed with a plurality of positioning members; the positioning member includes a screw portion used for threading and fixing the positioning member on the side plate, a mounting segment extended from the screw portion, and a stopping portion connected to an outer end of the mounting segment;
   wherein the outer main plates are set between an upper end and a lower end of the two side plates respectively; the outer main plate includes an assembly block set with at least one assembly hole, a receiving portion disposed on each of two sides thereof for receiving the assembly block, a penetrating hole corresponding to the assembly hole, and an assembly member mounted into the assembly hole of the assembly block; one end of the assembly block corresponding to the side plate is disposed with at least one detent hole and the detent hole is communicating with the assembly hole; each of the two sides of the outer main plate is covered by a protective board; the protective board being set with an insertion hole corresponding to the detent hole of the assembly block; wherein the assembly member is disposed with a detent slot, a mounting slot and a mounting groove; the detent slot corresponding to the detent hole and used for connection to the mounting segment of the positioning member is mounted on one end of the assembly member; the mounting slot is located at a lateral side of the detent slot, communicating with the detent slot and connected to the stopping portion of the positioning member; the mounting groove is formed on an outer surface of the assembly member;

wherein the inner partition is arranged between the two side plates; the inner partition includes a fixing block disposed with a fixing hole and a fixing slot, a connection portion set on each of two sides of the inner partition for mounting the fixing block, an open hole corresponding to both the fixing hole and the fixing slot and arranged at a bottom surface thereof, a fixing member mounted in the fixing hole of the fixing block and arranged with a fixing groove, and a fixing pin mounted in the fixing member; the fixing hole is formed on a bottom surface of the fixing block while the fixing slot is arranged at one end of the fixing block corresponding to the side plate and communicating with the fixing hole; the fixing groove is corresponding to the fixing slot;

wherein the fixing pin includes an insertion slot, a receiving slot and a receiving groove; the insertion slot is corresponding to the fixing groove and used for connection to the mounting segment of the positioning member; the receiving slot is located at a lateral side of the insertion slot, communicating with the insertion slot, and used for connection to the stopping portion of the positioning member; the receiving groove is set on an outer surface of the fixing pin and corresponding to the fixing hole.

2. The device as claimed in claim 1, wherein the mounting groove on the outer surface of the assembly member is able to be driven by a Phillips screwdriver, or a slotted screwdriver.

3. The device as claimed in claim 1, wherein the receiving groove on the outer surface of the fixing pin is able to be driven by a Phillips screwdriver, or a slotted screwdriver.

4. The device as claimed in claim 1, wherein each of the two sides of the inner partition is covered by a protective plate; the protective plate is set with an opening corresponding to the fixing slot of the fixing block.

5. The device as claimed in claim 1, wherein a back plate is used to connect to and fix on a rear surface of the aluminum cabinet composed of the side plates, the outer main plates, and the inner partition.

6. An aluminum cabinet comprising:
at least two side plates made from aluminum alloy;
at least two outer main plates made from aluminum alloy; and
at least one inner partition made from aluminum alloy;
wherein an upper edge, a lower edge and a middle part of an inner surface of the side plate are disposed with a plurality of positioning members; the positioning member includes a screw portion used for threading and fixing the positioning member on the side plate, a mounting segment extended from the screw portion, and a stopping portion connected to an outer end of the mounting segment;

wherein the outer main plates are set between an upper end and a lower end of the two side plates respectively; the outer main plate includes an assembly block set with at least one assembly hole, a receiving portion disposed on each of two sides thereof for receiving the assembly block, a penetrating hole corresponding to the assembly hole, and an assembly member mounted into the assembly hole of the assembly block; one end of the assembly block corresponding to the side plate is disposed with at least one detent hole and the detent hole is communicating with the assembly hole; wherein the assembly member is disposed with a detent slot, a mounting slot and a mounting groove; the detent slot corresponding to the detent hole and used for connection to the mounting segment of the positioning member is mounted on one end of the assembly member; the mounting slot is located at a lateral side of the detent slot, communicating with the detent slot and connected to the stopping portion of the positioning member; the mounting groove is formed on an outer surface of the assembly member;

wherein the inner partition is arranged between the two side plates; the inner partition includes a fixing block disposed with a fixing hole and a fixing slot, a connection portion set on each of two sides of the inner partition for mounting the fixing block, an open hole corresponding to both the fixing hole and the fixing slot and arranged at a bottom surface thereof, a fixing member mounted in the fixing hole of the fixing block and arranged with a fixing groove, and a fixing pin mounted in the fixing member; each of the two sides of the inner partition is covered by a protective plate; the protective plate is set with an opening corresponding to the fixing slot of the fixing block, the fixing hole is formed on a bottom surface of the fixing block while the fixing slot is arranged at one end of the fixing block corresponding to the side plate and communicating with the fixing hole; the fixing groove is corresponding to the fixing slot;

wherein the fixing pin includes an insertion slot, a receiving slot and a receiving groove; the insertion slot is corresponding to the fixing groove and used for connection to the mounting segment of the positioning member; the receiving slot is located at a lateral side of the insertion slot, communicating with the insertion slot, and used for connection to the stopping portion of the positioning member; the receiving groove is set on an outer surface of the fixing pin and corresponding to the fixing hole.

* * * * *